United States Patent
Chen et al.

(10) Patent No.: US 7,683,958 B1
(45) Date of Patent: Mar. 23, 2010

(54) CAMERA EXPOSURE INDICATION INTERFACE

(75) Inventors: Michael Chen, Mountain View, CA (US); Richard F. Lyon, Los Altos, CA (US); Richard M. Turner, Mountain View, CA (US)

(73) Assignee: Foveon, Inc., Santa Clara, CA (US)

( * ) Notice: Subject to any disclaimer, the term of this patent is extended or adjusted under 35 U.S.C. 154(b) by 2095 days.

(21) Appl. No.: 10/355,750

(22) Filed: Jan. 31, 2003

(51) Int. Cl.
*H04N 5/222* (2006.01)

(52) U.S. Cl. ............................. 348/333.01; 348/333.02; 348/333.12

(58) Field of Classification Search ........................ None
See application file for complete search history.

(56) References Cited

U.S. PATENT DOCUMENTS

| | | | |
|---|---|---|---|
| 4,286,857 A * | 9/1981 | Mita .......................... | 396/296 |
| 5,041,911 A | 8/1991 | Moorman | |
| 5,164,836 A | 11/1992 | Jackson et al. | |
| 5,228,450 A * | 7/1993 | Sellers ........................ | 600/524 |
| 6,347,192 B1 * | 2/2002 | Malloy Desormeaux et al. .......................... | 396/287 |
| 7,098,946 B1 * | 8/2006 | Koseki et al. ............ | 348/229.1 |
| 7,154,544 B2 * | 12/2006 | Kowno et al. .......... | 348/240.99 |
| 7,158,183 B1 * | 1/2007 | Ohta .......................... | 348/364 |
| 2004/0012689 A1 * | 1/2004 | Tinnerino et al. ........ | 348/218.1 |
| 2006/0092151 A1 * | 5/2006 | Allen .......................... | 345/204 |

OTHER PUBLICATIONS

Phil Askey, Nikon D1 Review, Nov. 2000, http://www.dpreview.com/reviews/nikond1/page9.asp (This document has been faxed to Applicant on Jun. 17, 2009).*

(Continued)

*Primary Examiner*—Luong T Nguyen
(74) *Attorney, Agent, or Firm*—Lewis and Roca LLP

(57) ABSTRACT

Systems and methods of providing spatially dependent image exposure information to a user of a digital camera. The described approach is applicable to determination of image exposure quality in a digital camera system. In these applications an image is displayed in a first display mode wherein the exposure information is overlaid on the image or in a second display mode wherein the exposure information is eliminated or reduced and thus is less obstructive of the image. In the second display mode, a separate exposure warning optionally conveys a subset of the information displayed in the first display mode. The invention includes a user input operable to temporarily specify a change in the display of the image between the first mode and the second mode while an image is displayed, thus providing the user with direct control of the presence and duration of spatially dependent image exposure information.

58 Claims, 2 Drawing Sheets

OTHER PUBLICATIONS

Figure 1:
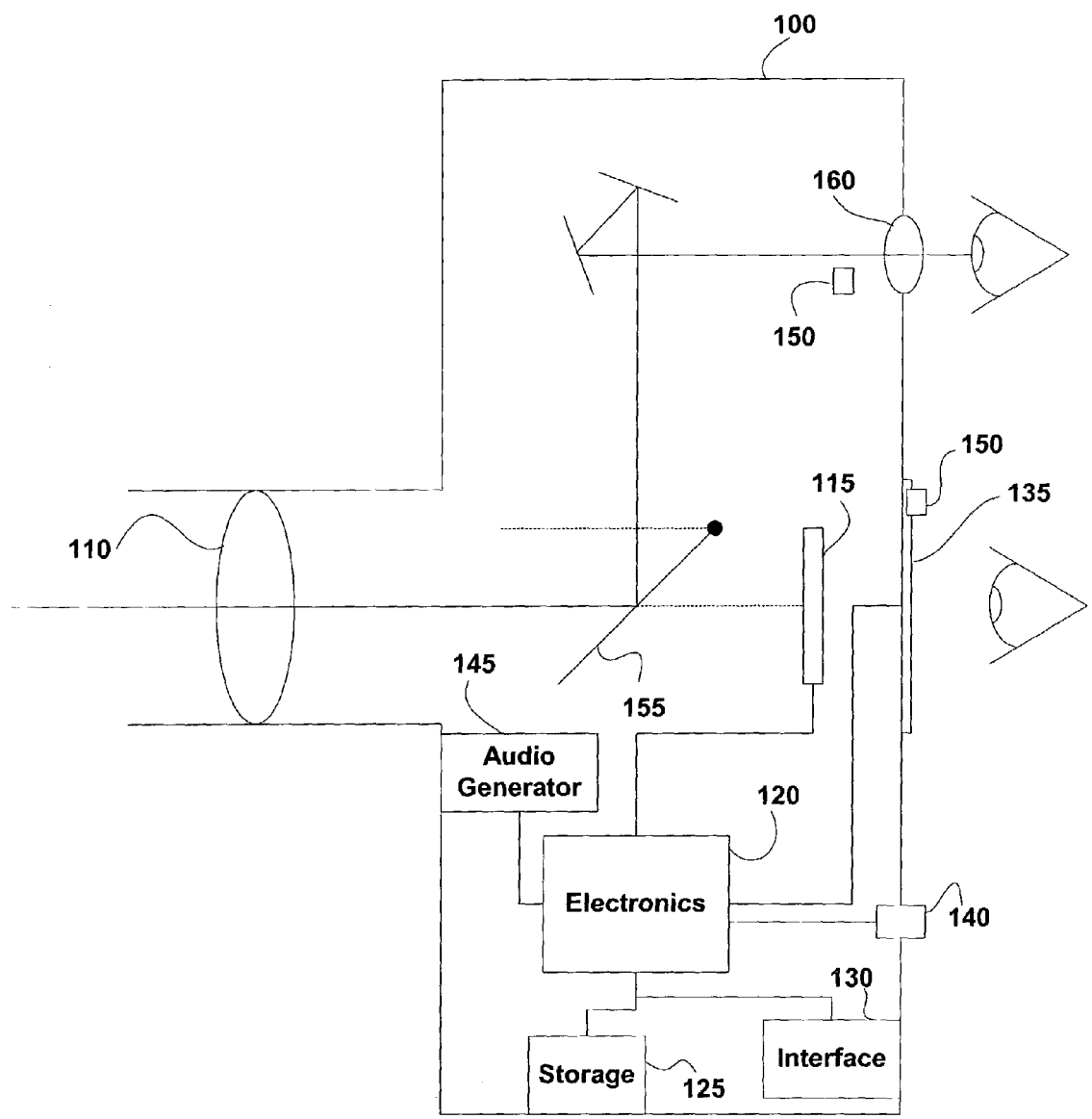

Author Unknown, "SIGMA Photo Pro User Guide-Companion Processing Software for the SIGMA SD9 Digital Camera", Version 1.0, no publication date listed.
Author Unknown, "Foveon User Guide", Foveon, Inc., Software Version 2.7, 34 pages, Jul. 2001.
Author Unknown, "FoveonCAM", Foveon, Inc., V2.7, 1 page, Jul. 27, 2001.
Author Unknown, "FoveonLAB", Foveon, Inc., V.27, 1 page, Jul. 27, 2001.
Stephen Johnson, Foveon User Guide, Jan. 2000.
Author Unknown, Screen captures from Adobe Photoshop 5.5 "Levels Dialog Box" help information.
Author Unknown, Nikon Capture 2 User's Manual. pp. 93-130.
Author Unknown, Canon EOS D-60 Digital Software Instructions, 2002, Section 3-19.
U.S. Appl. No. 10/355,478, Michael Chen, User Interface for Image Processing, filed Jan. 31, 2003.
Johnson, Stephen, Foveon User Guide, Published Sep. 15, 2000; Revised Jan. 15, 2001. (Reference Submitted Apr. 4, 2003).
Jared, David and Chen, Michael, Foveon Quickstart 2.7: FoveonCAM, Jul. 27, 2001.
Jared, David and Chen, Michael, Foveon Quickstart 2.7: FoveonLAB, Jul. 27, 2001.
Foveon, Inc., SIGMA Photo Pro User Guide v1.0, Sep. 2002.

* cited by examiner

CAMERA EXPOSURE INDICATION INTERFACE

BACKGROUND

1. Field of the Invention

The invention is in the field of photography and specifically in the field of digital photography.

2. Prior Art

Digital technology has contributed significantly to the field of photography. Digital cameras greatly increase ease of image capture and manipulation relative to conventional technologies. However, the quality of a digitally captured image is still limited by the dynamic range of the image collection process. It is, therefore, desirable to indicate to a user information regarding the exposure characteristics of a captured digital image.

These exposure characteristics may include, for example, a distribution of exposure levels within an image or an indication that a maximum exposure level has been exceeded. Some digital cameras display a histogram indicative of the varying exposure levels found in a captured image. Other digital cameras display a series of exposure "zones" overlaid on a captured image. Each exposure zone is indicative of a different exposure level. In at least one instance, a digital camera indicates specific regions of a captured image that are overexposed by "blinking" the specific regions in a display of the image.

Systems in which exposure information is overlaid on an image and/or systems which blink specific regions of an image provide spatially dependent exposure information that, unfortunately, also obscures the underlying image. There is a need in the art for improved ways to display digital images and their corresponding exposure information.

SUMMARY OF THE INVENTION

Various embodiments of the invention include a digital camera including two inputs configured to control an amount of spatially dependent exposure information displayed with an image. In these embodiments, one input is configured to perform a temporary change in the amount while the other input is configured to perform a persistent change. Various embodiments of the invention include a digital camera including an input configured to control an amount of spatially dependent exposure information displayed with an image, the input being operable during display of the image.

Some embodiments of the invention include a camera comprising an image sensor configured for use in generating digital image data, an image display configured to display the digital image data as an image and to operate in at least a display-exposure-on mode having spatially dependent exposure information overlaid on the image and a display-exposure-off mode without the spatially dependent exposure information overlaid on the image, a first user input operable to initiate a change between the display-exposure-on mode and the display-exposure-off mode while the image is displayed, and electronics configured to control the display and to control the image sensor. In these embodiments the change is temporary and in some of these embodiments the change is automatically reversed. Some embodiments further include a second user input configured to specify a persistent change between the display-exposure-on mode and the display-exposure-off mode, the specification being persistent until another specification is made.

Some embodiments of the invention include a camera comprising an image sensor, an image display configured for displaying an image in at least a display-exposure-off mode and a display-exposure-on mode, using digital data, the display-exposure-on mode having a greater amount of spatially dependent exposure information overlaid on the image relative to the display-exposure-off mode, a first user input operable to initiate a temporary change between operation of the display in the display-exposure-on mode and operation of the display in the display-exposure-off mode, and electronics configured to generate the digital image data using an output of the image sensor and to control the display responsive to the first user input.

Some embodiments of the invention include an exposure warning indicator configured to generate an exposure warning. Some embodiments of the invention include means for automatically reversing a temporary change in operation of the camera between a first display mode and a second display mode.

Some embodiments of the invention include a method of displaying a captured image, the method comprising the steps of capturing an image using an image sensor responsive to electronics, generating digital image data representing the captured image using an output of the image sensor, displaying the captured image on a display using the digital image data, in a display-exposure-on mode the display including spatially dependent exposure information overlaid on the captured image and in a display-exposure-off mode the display not including the spatially dependent exposure information overlaid on the captured image, the display being responsive to the electronics, receiving a first user input during the display of the captured image, and executing a temporary change between the display-exposure-on mode and the display-exposure-off mode, responsive to the first user input.

Some embodiments of the invention include a method of operating a digital camera, the method comprising the steps of (a) capturing an image using an image sensor responsive to electronics, (b) generating digital image data representing the image using an output of the image sensor, (c) displaying the image on a display in a display-exposure-off mode, the display being responsive to the electronics, (d) generating an exposure warning indicative of an exposure characteristic of the image, (e) receiving a first user input during the display of the image, (f) executing a temporary change between the display-exposure-off mode and the display-exposure-on mode, responsive to the first user input, (g) displaying the image on the display in a display-exposure-on mode, the display-exposure-on mode including more spatially dependent exposure information overlaid on the image than the display-exposure-off mode, (h) evaluating the image using the spatially dependent exposure information, and (i) determining whether to store the image data or to capture another image, responsive to the evaluation.

Some embodiments of the invention include steps of executing a change between the display-exposure-on mode and the display-exposure-off mode using a first user input and specifying a persistent change between the display-exposure-on mode and the display-exposure-off mode using a second user input.

BRIEF DESCRIPTION OF THE VARIOUS VIEWS OF THE DRAWING

Figure 2:
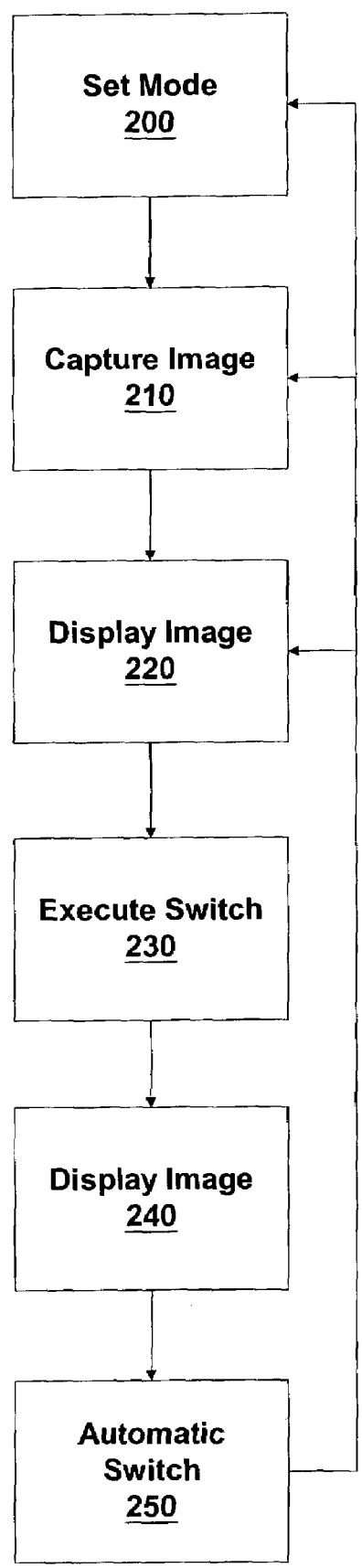

FIG. 1 illustrates a diagram of a digital camera according to various embodiments of the invention; and FIG. 2 illustrates a method of temporarily switching between display modes according to various embodiments of the invention.

DETAILED DESCRIPTION OF THE INVENTION

The invention includes systems and methods for capturing and displaying an image on a display. The display optionally includes exposure information overlaid on the image such that exposure characteristics of various regions of the image are indicated. The invention typically operates in at least two display modes. A first display mode (display-exposure-on mode) in which spatially dependent exposure information is displayed overlaid on the image, and a second display mode (display-exposure-off mode) in which some or all of the exposure information displayed in the display-exposure-on mode is absent. A user may specify operation of a digital camera to be in the display-exposure-on mode or to be in the display-exposure-off mode. Using a first input, specification of one of the display modes as a "current display mode," with which an image is displayed, is preserved until a new current display mode is specified. Using a second input, the specification of the current display mode is temporary, and optionally automatically reversed. The second, "temporary-change," input is configured to temporarily switch between the display modes during the display of an image. This switch changes operation of the camera between the display-exposure-on mode and the display-exposure-off mode.

Either the display-exposure-on mode or the display-exposure-off mode may be supplemented by an additional "exposure warning" indication that gives a user notice of an exposure condition but does not provide spatially dependent exposure information that obscures the image. For example, in one embodiment, while the image is displayed in display-exposure-off mode, an audio signal and/or light emitting diode (LED) signal optionally indicates that some unspecified region of a captured digital image is overexposed.

Various embodiments of the invention include a digital camera with the "temporary-change" input configured to toggle between the display modes while displaying a captured image. The temporary-change input is used to temporarily change the display mode from the display-exposure-on mode to the display-exposure-off mode, or vice-versa. A temporary change is a change that is not preserved, unless a new persistent current display mode is specified. In some embodiments, a temporary change is automatically reversed unless a user takes further action to make the temporary change a persistent change. For example, when a captured image is displayed in the display-exposure-off mode, the temporary-change input is used to add spatially dependent exposure information to the display. The spatially dependent exposure information is overlaid on the image such that the information is associated with one or more specific image regions. When the temporary-change input is disengaged, the spatially dependent exposure information is automatically removed from the display. While displaying a captured image in the display-exposure-on mode, the temporary-change input is used to temporarily remove spatially dependent exposure information from the display. In this case, when the temporary-change input is disengaged, the exposure information is automatically restored. The spatially dependent exposure information optionally indicates overexposure, underexposure, and/or an exposure range, among others. For example, in one embodiment both overexposure and underexposure are indicated using two different colors.

In some embodiments, an "exposure warning" is provided to a user in a spatially independent manner while in the display-exposure-off mode. For example, in some instances a symbol or light is used to indicate overexposure, underexposure, and/or an exposure range. When an exposure warning is shown while in the display-exposure-off mode, the user can optionally view spatially dependent exposure information by engaging the temporary-change input.

FIG. 1 illustrates a Digital Camera 100 according to various embodiments of the invention. Digital Camera 100 includes an optional Lens 110 disposed to form an image onto an Image Sensor 115. Image Sensor 115 is, for example, a charge coupled device or other photodetector, such as a Foveon X3™ Pro 10M. Image Sensor 115 captures an image by generating electronic signals responsive to detected light. These electronic signals are used to generate digital image data using Electronics 120. In some embodiments the digital image data includes real-time data or a real-time stream of image data (e.g., video image data representative of a video image). In some embodiments, a resolution of Image Sensor 115 is configurable by electronically interconnecting pixels within Image Sensor 115. Electronics 120 typically control Image Sensor 115 and include a logic circuit, a processing unit and/or the like, for manipulating the generated image data. Responsive to Electronics 120, digital image data is optionally stored using Storage 125. Storage 125 includes electronic, magnetic, optical, or like storage medium. In one embodiment, Storage 125 includes read only memory and an optional removable electromagnetic media. Electronics 120 receives input and optionally directs output at an Interface 130. In some embodiments, Interface 130 is a user input and includes a button, dial, thumbwheel, switch, slider, touch screen, and/or other user controls. In some embodiments, Interface 130 includes a shutter button. In some embodiments, Interface 130, is an interface configured to receive input from other electronic devices.

Electronics 120 is configured to provide digital image data representative of a captured image to a Display 135 wherein the image is displayed to a user. In various embodiments Display 135 is configured to display real-time images, video images, still images, or the like. These images are optionally displayed with reduced or variable resolution. Display 135 is controlled by Electronics 120 and includes a plasma, liquid crystal, light emitting diode, liquid crystal on silicon microdisplay, electronic ink, or alternative image display device. Display 135 is configured to operate in at least two display modes, the display-exposure-on mode and the display-exposure-off mode. The display mode in which Display 135 operates (the "current display mode") is optionally specified using Interface 130. For example, in one embodiment Interface 130 includes a dial for selecting items from a menu. In this embodiment, the menu items include commands to specify the display-exposure-on mode or the display-exposure-off mode to be the current display mode. If a specified display mode is not the current display mode, Interface 130 is used to initiate a change in the current display mode. When Interface 130 is used to specify a display mode, the specification persists until a different display mode is specified. In some embodiments, Display 135 is used to present the menu to the user. For example, in one of these embodiments, the menu is displayed in place of a captured image.

Digital Camera 100 includes a Temporary-Change Input 140 for use while displaying an image. Temporary-Change Input 140 is a user input configured to initiate a temporary change in the current display mode. In a typical embodiment, engaging Temporary-Change Input 140 initiates a switch between the display-exposure-on mode and the display-exposure-off mode. This temporary change is managed by Electronics 120 in response to input received from Temporary-Change Input 140. When the Temporary-Change Input 140 is disengaged, the temporary change in current display mode is automatically reversed. In one embodiment, the automatic reversal is responsive to a timer included in Electronics 120, rather than disengagement of Temporary-Change Input 140.

Temporary-Change Input 140 is optionally a button, dial, thumbwheel, switch, slider, touch screen and/or the like. In some embodiments, Temporary-Change Input 140 includes a first position configured to cause a temporary change in the current display mode and a second position configured to initiate another operation. For example, in one embodiment, Temporary-Change Input 140 is a shutter button configured to temporarily switch the current display mode when partially depressed to the first position and to store image data using Storage 125 when fully depressed to the second position. In another embodiment, Temporary-Change Input 140 is configured to temporarily switch the current display mode when partially depressed and configured to make a persistent change in the current display mode when fully depressed. In some embodiments, Temporary-Change Input 140 is included in Interface 130.

In the display-exposure-on mode, the spatially dependent exposure information is overlaid on the displayed image. In various embodiments, this overlay includes pixels of a specific color indicative of an exposure threshold, a plurality of specific colors indicative of different exposure levels, pixels of varying intensity, pixels of time dependent intensity variation, a set of pixels bounded by a border or line distinguishing the set of pixels from other pixels, or the like. The exposure information is optionally semi-transparent.

In some embodiments, Display 135 is further configured to present a non-spatially dependent exposure warning to the user. The exposure warning optionally includes a flashing subset of pixels in Display 135, pixels of a specific color, pattern or symbol, and/or the like. Typically, the exposure warning is configured to indicate overexposure, underexposure and/or an exposure range condition. The specific exposure condition indicated is optionally user selectable using Interface 130. In one embodiment an "O," a "U," or an "R" symbol are used to indicate the above conditions, respectively. The exposure range condition optionally includes wide or narrow distributions of exposure levels. Thus, an exposure warning may indicate to a user that a captured image includes a narrow range of exposure levels. In some embodiments, Electronics 120 are configured to activate the exposure warning responsive to a maximum exposure level with a captured image. In some embodiments the exposure warning includes generation of an audio signal using an Audio Generator 145. In some embodiments, the exposure warning is presented to a user using an Exposure Warning Indicator 150 such as a light, light emitting diode, liquid crystal display, or the like. The Exposure Warning Indicator 150 is optionally separate from Display 135.

In some embodiments, Display 135 is further configured to operate as a viewfinder. In these embodiments, Display 135 is optionally used to preview a captured image, or a real-time sequence of captured images, prior to saving in Storage 125. Spatially dependent exposure information is optionally displayed with the image regardless of whether corresponding image data has been saved in Storage 125. Thus, spatially dependent exposure information can be viewed by a user and used to determine if image data should be saved in Storage 125 or if another image should be captured.

In some embodiments, Display 135 operates as a viewfinder and also displays image data captured by Image Sensor 115 in real-time or near real-time. In these embodiments, Display 135 is optionally configured to show a reduced resolution or windowed (e.g., zoomed) portion of the captured image data. A reduced resolution is a resolution lower than a maximum resolution of Image Sensor 115. The displayed image data can be a real-time stream of captured image data (e.g., video image data) or a single still image. In one embodiment, the user can select to store video image data as either data representing the captured image stream or data representing a single still image from the captured image stream. Reduced resolution information is optionally obtained by sub-sampling of the image data or by operation of Image Sensor 115 in a thinned mode or in a binned mode. In a thinned mode, not all pixels are sampled. In a binned mode, pixels on the image sensor are electronically interconnected and the interconnected pixels are sampled as a group. Displaying only a portion of the total image, to effect a digital zoom, is optionally accomplished either by manipulation of the image data and/or by operation of Sensor 115 in a digital zoom mode configured to sample only selected portions of Sensor 115. Spatially dependent exposure information is optionally displayed with either the real-time stream of image data or the single still image. When the exposure information is displayed, the user may optionally use the exposure information to determine whether or not an image or sequence of images should be stored, or to determine a selection of current or future exposure settings.

Some embodiments of Digital Camera 100 include an Auxiliary Viewfinder 160 configured for a user to view an image prior to capture. An optional Reflector 155 is used to alternatively direct light to Auxiliary Viewfinder 160 or Image Sensor 115. In some embodiments, Exposure Warning Indicator 150 is disposed to be visible to a user viewing an image through Auxiliary Viewfinder 160. In an alternative embodiment, Display 135 is a transparent display and is included in Auxiliary Viewfinder 160.

FIG. 2 illustrates a method of temporarily switching between display modes according to various embodiments of the invention. In an optional Set Mode Step 200 the current display mode is specified using Interface 130. This specification persists until the current display mode is again specified. In some embodiments, Set Mode Step 200 is performed prior to delivery of Digital Camera 100 to an end user. In some embodiments, Set Mode Step 200 is performed when Digital Camera 100 is turned on. In a Capture Image Step 210, digital image data is generated using Image Sensor 115 and Electronics 120. Capture Image Step 210 optionally includes storing the image data using Storage 125. In some embodiments, Capture Image Step 210 includes determining a resolution for capturing the image data. In some embodiments, Capture Image Step 210 includes determining whether to capture real-time (e.g., video) image data or to capture still image data.

In a Display Image Step 220 the image captured in Capture Image Step 210 is displayed using Display 135 and the digital image data. In some embodiments, Display Image Step 220 includes determining a resolution for displaying the captured image on Display 135. In these embodiments, the determined resolution may be a reduced resolution less than the maximum resolution of Image Sensor 115. The data is displayed in the display-exposure-on mode or in the display-exposure-off mode responsive to the display mode specified in Set Mode Step 200. In various embodiments, Display Image Step 220 includes activation of the Exposure Warning Indicator 150 to generate an exposure warning. As discussed herein, the exposure warning may include a variety of visual or auditory signals. For example, in one embodiment the exposure warning includes a light displayed in Auxiliary Viewfinder 160.

In Execute Switch Step 230, a user initiates a change in the current display mode using Temporary-Change Input 140. When Temporary-Change Input 140 is engaged, Electronics 120 responds by temporarily switching the current display mode between the display-exposure-on mode and the display-exposure-off mode. Thus, the amount of spatially dependent exposure information shown on Display 135 is temporarily changed.

In a Display Image Step 240 the image captured in Step 210 is again displayed using Display 135. This displaying reflects a change in the amount of spatially dependent exposure information shown, responsive to the changed display mode. If Execute Switch Step 230 included changing the current display mode from the display-exposure-on mode to the display-exposure-off mode, then the amount of spatially dependent exposure information is changed relative to that shown in Display Image Step 220. In some embodiments, this change includes an elimination of spatially dependent exposure information. While, in other embodiments this change includes a reduction in the amount of spatially dependent exposure information. If Execute Switch Step 230 included changing the current display mode from display-exposure-off mode to display-exposure-on mode, then the amount of spatially dependent exposure information is increased relative to that shown in Display Image Step 220. In some embodiments, the image is displayed on Display 135 during Execute Switch Step 230.

In an Automatic Switch Step 250, the temporary switch in current display mode made in Execute Switch Step 230 is reversed. In some embodiments, the duration of the temporary display mode change, that occurs between Execute Switch Step 230 and Automatic Switch Step 250, is equal to a period during which Temporary-Change Input 140 is engaged. In these cases, the current display mode is changed for a period between the time that Temporary-Change Input 140 is activated and the time that Temporary-Change Input 140 is released. The duration is, therefore, user controllable during displaying of an image. In other embodiments, the duration is determined by a timer having a default or user selectable delay. At the conclusion of Automatic Switch Step 250 the current display mode is persistent until another display mode is specified.

In some embodiments, the method returns to Set Mode Step 200 wherein Interface 130 is again used to specify the current display mode of Digital Camera 100 to be the display-exposure-on mode or to be the display-exposure of mode, the specification being persistent until a subsequent current display mode is specified.

In some embodiments, the method returns from Automatic Switch Step 250 to Capture Image Step 210 wherein Electronics 120 is again used to capture an image. In some embodiments, the method returns from Automatic Switch Step 250 to Display Image Step 220. The image is optionally displayed continuously from the first execution of Display Image Step 220, through Steps 230, 240 and 250, and back to Display Image Step 220.

In some embodiments, a user will use Display Image Step 220 and/or Display Image Step 240 to evaluate the image. For example, in one embodiment the image will be viewed and evaluated for exposure quality in the display-exposure-on mode. In these embodiments, a user may determine whether to store and/or further manipulate the image, to capture another image, or to select an exposure setting. In a step not shown, the digital image data, representing the captured image, is optionally stored using Storage 125. In some embodiments, this storage step includes determining whether to store the digital image data as a real-time stream of captured image data or as still image data.

Several embodiments are specifically illustrated and/or described herein. However, it will be appreciated that modifications and variations are covered by the above teachings and within the scope of the appended claims without departing from the spirit and intended scope thereof. For example, some embodiments the current display mode may be specified to be a mode other then the display-exposure-on mode or the display-exposure-off mode.

We claim:

1. A camera comprising:
an image sensor configured for use in generating digital image data;
an image display configured to display the digital image data as an image and to operate in at least a display-exposure-on mode having exposure information overlaid on the image, the exposure information being spatially dependent on the digital image data, and a display-exposure-off mode without the exposure information overlaid on the image;
a first user input operable to initiate a temporary current display mode change between the display-exposure-on mode and the display-exposure-off mode while the image is displayed; and
electronics configured to control the display and to control the image sensor, the electronics operable to initiate the temporary current display mode change in response to engaging the first user input and to automatically reverse the temporary current display mode change responsive to release of the first user input.

2. The camera of claim 1, wherein the electronics is further configured to automatically reverse the temporary current display mode change responsive to a timer.

3. The camera of claim 1, further including a second user input configured to initiate a persistent current display mode change between the display-exposure-on mode and the display-exposure-off mode, the change being persistent until another current display mode is specified.

4. The camera of claim 1, further including a lens configured to form an image on the image sensor.

5. The camera of claim 1, further including a second user input configured to specify the current display mode to be the display-exposure-on mode or to be the display-exposure-off mode, the specification being persistent until another current display mode is specified.

6. The camera of claim 1, further including an exposure warning configured for display in the display-exposure-off mode.

7. The camera of claim 6, wherein the electronics are further configured to activate the exposure warning responsive to a maximum exposure level within the image.

8. The camera of claim 7, wherein the exposure warning includes a subset of pixels in the display.

9. The camera of claim 6, wherein the exposure warning includes an auditory signal.

10. The camera of claim 1, wherein the exposure information includes pixels of a plurality of specific colors indicative of different exposure levels.

11. The camera of claim 1, wherein the exposure information includes pixels of varying intensity, the varying intensity being time dependent.

12. The camera of claim 1, wherein the exposure information includes a set of pixels bounded by a line.

13. The camera of claim 1, wherein the digital image data is real-time data.

14. The camera of claim 1, wherein the digital image data is a real-time stream of captured image data.

15. The camera of claim 1, wherein the first user input includes a first position operable to initiate a temporary current display mode change between the display-exposure-on mode and the display-exposure-off mode, and a second position operable to initiate a persistent current display mode change between the display-exposure-on mode and the display-exposure-off mode, the temporary current display mode change being automatically reversed, the persistent current display mode change being persistent until another current display mode is specified.

16. A camera comprising:
   an image sensor;
   an image display configured for displaying an image in at least a display-exposure-off mode and a display-exposure-on mode, using digital image data, the display-exposure-on mode having a first amount of exposure information overlaid on the image and the display-exposure-off mode having a second amount of exposure information overlaid on the image, the second amount of exposure information being spatially dependent on the digital image data, the first amount of exposure information being greater than the second amount of exposure information;
   a first user input operable to initiate a temporary current display mode change between operation of the image display in the display-exposure-on mode and operation of the display in the display-exposure-off mode; and
   electronics configured to generate the digital image data using an output of the image sensor and to control the display responsive to the first user input.

17. The camera of claim 16, further including a lens configured to form an image on the image sensor.

18. The camera of claim 16, wherein the electronics are further configured to automatically reverse the temporary current display mode change or to make the temporary current display mode change a persistent current display mode change responsive to a second user input.

19. The camera of claim 18, wherein the electronics includes a timer configured to automatically reverse the temporary current display mode change.

20. The camera of claim 16, wherein a duration of the temporary current display mode change is user controllable.

21. The camera of claim 20, wherein the duration is user controllable using the first user input.

22. The camera of claim 20, wherein the duration is user controllable while the image is displayed.

23. The camera of claim 16, wherein the image display includes a viewfinder.

24. The camera of claim 23, wherein the exposure information is semi-transparent.

25. The camera of claim 23, wherein the viewfinder is configured to display the image at a resolution lower than a maximum resolution of the image sensor.

26. The camera of claim 25, wherein the resolution of the image sensor is modified by operation of the image sensor in a binned mode wherein pixels on the image sensor are electronically interconnected.

27. The camera of claim 25, wherein the resolution of the image is responsive to sub-sampling of the image data.

28. The camera of claim 23, wherein the image is displayed in a digital zoom mode.

29. The camera of claim 16, further including a second user input configured to specify a current display mode of the image display to be the display-exposure-on mode or to be the display-exposure-off mode, the specification being persistent until another current display mode is specified.

30. The camera of claim 16, further including an exposure warning indicator responsive to a distribution of exposure levels within the image.

31. The camera of claim 16, further including an exposure warning indicator responsive to a minimum exposure level within the image and configured to be activated in the display-exposure-off mode.

32. The camera of claim 16, further including an audio generator configured to generate an exposure warning.

33. The camera of claim 16, wherein the image is a video image.

34. A method of displaying a captured image, the method comprising the steps of:
   capturing an image using an image sensor responsive to electronics;
   generating digital image data representing the captured image using an output of the image sensor;
   displaying the captured image on a display using the digital image data, in a display-exposure-on mode the display including exposure information overlaid on the captured image, the exposure information being spatially dependent on the digital image data, and in a display-exposure-off mode the display not including the exposure information overlaid on the captured image, the display being responsive to the electronics;
   receiving a first user input during the display of the captured image;
   executing a temporary current display mode change between the display-exposure-on mode and the display-exposure-off mode, responsive to the first user input; and
   receiving a second user input and, responsive to the second user input, specifying the current display mode of the digital camera to be the display-exposure-on mode or to be the display-exposure-off mode, the specification being persistent until a subsequent current display mode is specified.

35. The method of claim 34, further including a step of automatically reversing the temporary current display mode change.

36. The method of claim 34, wherein the temporary current display mode change has a duration equal to a period during which the user input is received.

37. The method of claim 34, wherein the step of receiving a first user input occurs when a user input device is partially activated and the step of receiving a second user input occurs when the user input device is further activated.

38. The method of claim 34, wherein the step of receiving a first user input is responsive to operation of a button, responsive to operation of a dial, responsive to operation of a thumbwheel or responsive to operation of a slider.

39. The method of claim 38, wherein the step of executing a current display mode change is initiated when the button, the dial, the thumbwheel or the slider is activated and the step of executing a current display mode change is automatically reversed responsive to release of the button, dial, thumbwheel or slider, respectively.

40. The method of claim 34, wherein the step of receiving a first user input occurs when a shutter button is partially depressed.

41. The method of claim 34, wherein the spatially dependent exposure information includes pixels of a plurality of specific colors indicative of different exposure levels.

42. The method of claim 34, wherein the spatially dependent exposure information includes pixels of varying intensity, the intensity variation being time dependent.

43. The method of claim 34, wherein the spatially dependent exposure information includes a set of pixels bounded by a line.

44. The method of claim 34, further including a step of providing an exposure warning during the step of displaying the image on a display.

45. The method of claim 44, wherein the step of providing an exposure warning includes generation of an audio signal.

46. The method of claim 44, wherein the step of providing an exposure warning includes activation of a light.

47. The method of claim 44, wherein the step of providing an exposure warning includes displaying the exposure warning on a subset of pixels in the display.

48. The method of claim 34, further including a step of evaluating the image, the evaluation including viewing the image in the display-exposure-on mode.

49. The method of claim 48, further including a step of storing the image data responsive to the evaluation.

50. The method of claim 34, wherein the captured image is a video image.

51. The method of claim 34, further including a step of determining whether to store the digital image data as a real-time stream of captured image data or as still image data.

52. The method of claim 34, wherein the step of displaying the captured image includes displaying the captured image at a resolution less than the maximum resolution of the image sensor.

53. The method of claim 52, further including a step of determining a resolution for displaying the captured image on the display.

54. A camera comprising:
an image sensor responsive to electronics;
means for displaying an image captured using the image sensor, the image being displayed in at least a first display mode having exposure information overlaid on the image, the exposure information being spatially dependent on the digital image data, and a second display mode having a different amount of the exposure information overlaid on the image relative to the first display mode, the means being responsive to the electronics;
means for temporarily changing display of the image between the first display mode and the second display mode while the image is displayed; and
means for specifying a persistent change in the display of the image between the first display mode and the second display mode, the specification being persistent until another display mode is specified for display of the image.

55. The camera of claim 54, further comprising means for generating an exposure warning.

56. The camera of claim 54, further comprising means for automatically reversing the temporary change between the first display mode and the second display mode.

57. The camera of claim 1 wherein the first user input is a button.

58. The camera of claim 1 wherein the first user input is a virtual button on a touch screen.

* * * * *